A. E. SORUM & R. T. BROCKMAN.
REGISTERING AND MONEY PAYING MACHINE.
APPLICATION FILED AUG. 3, 1914.
1,257,143.
Patented Feb. 19, 1918.
11 SHEETS—SHEET 1.
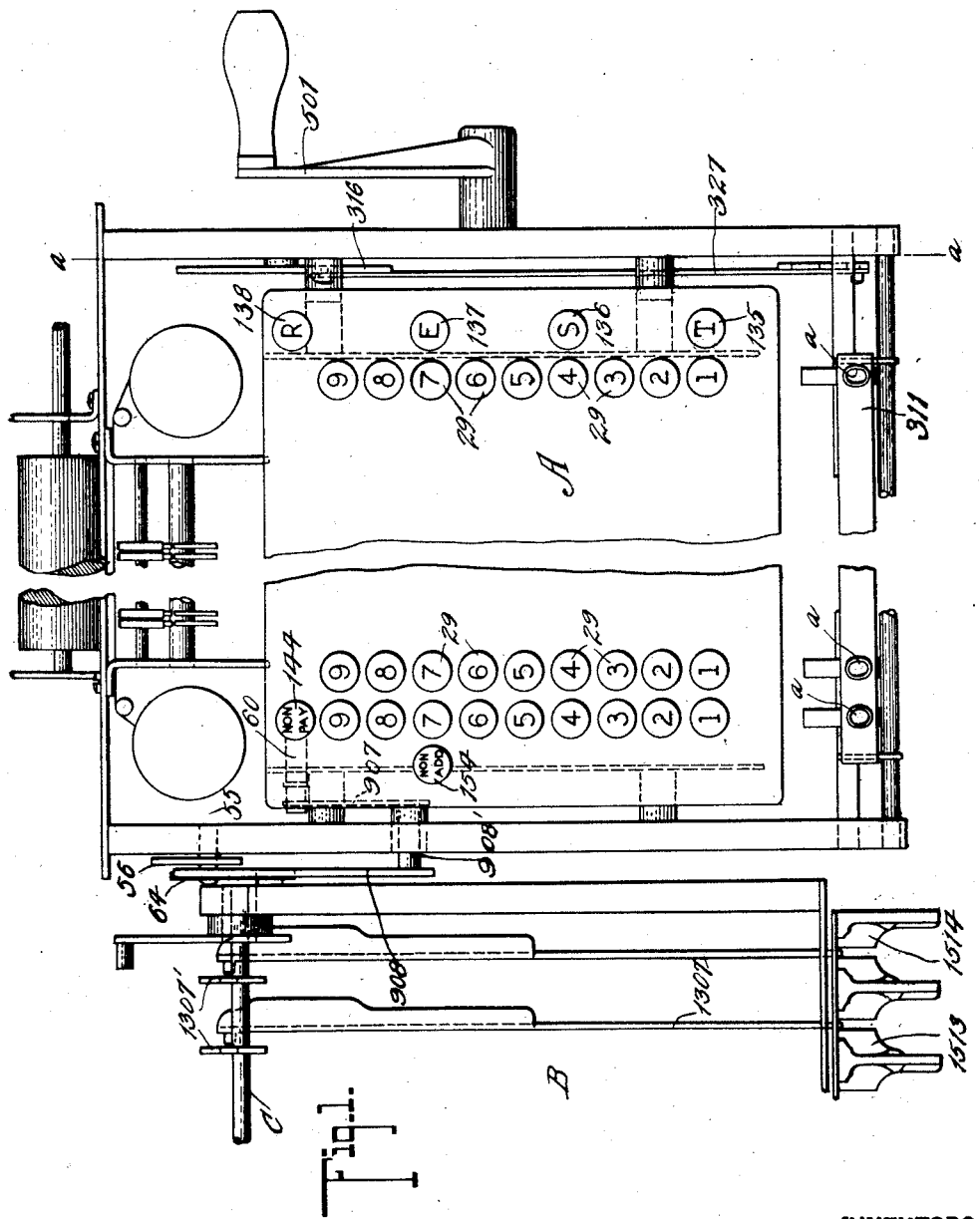
WITNESSES:
INVENTORS
BY
ATTORNEY

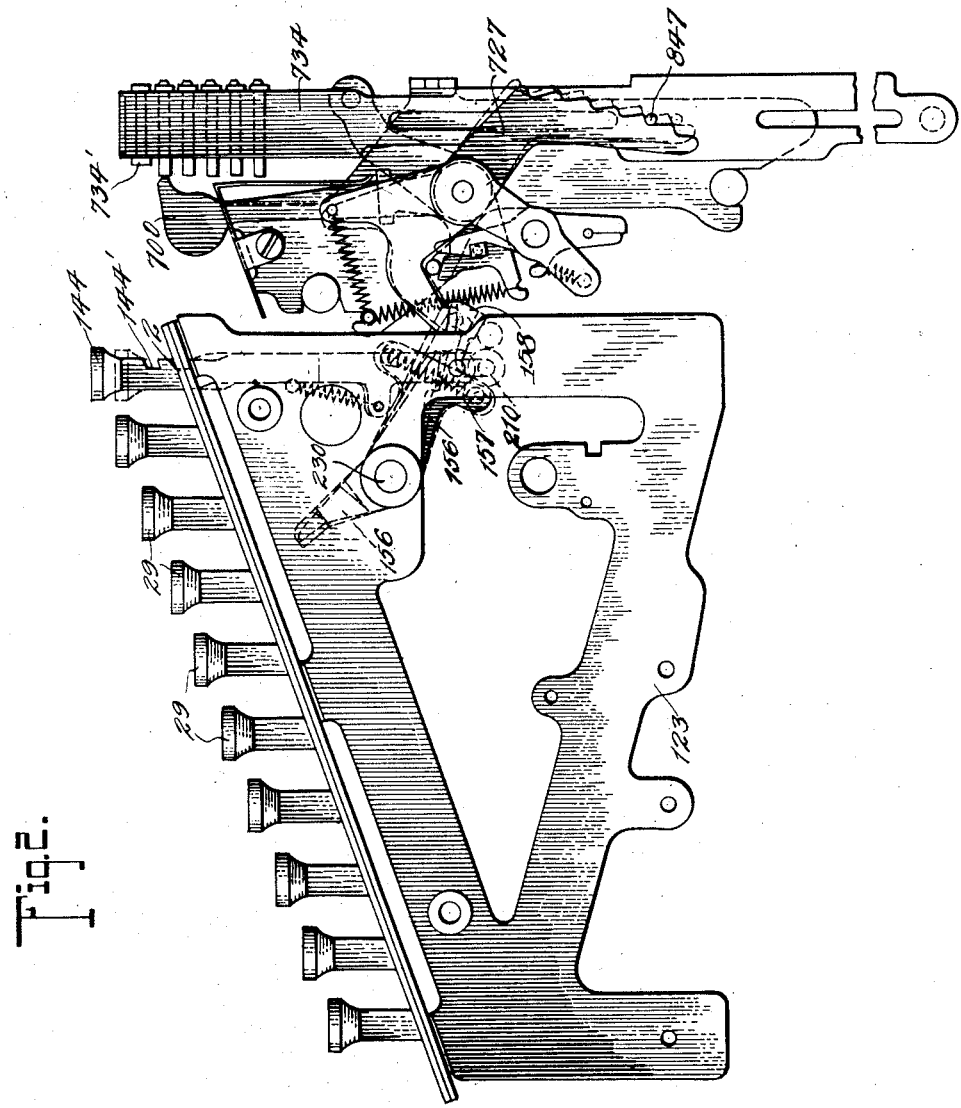

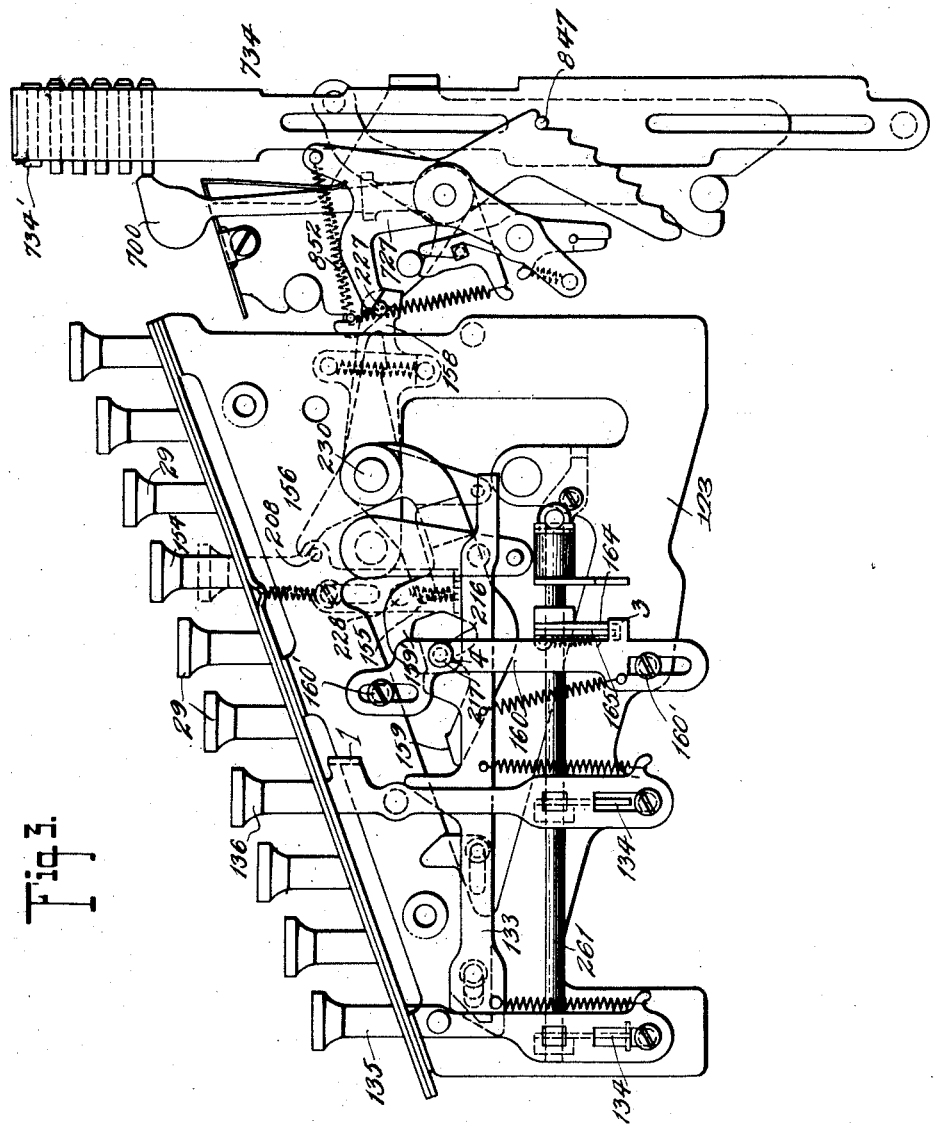

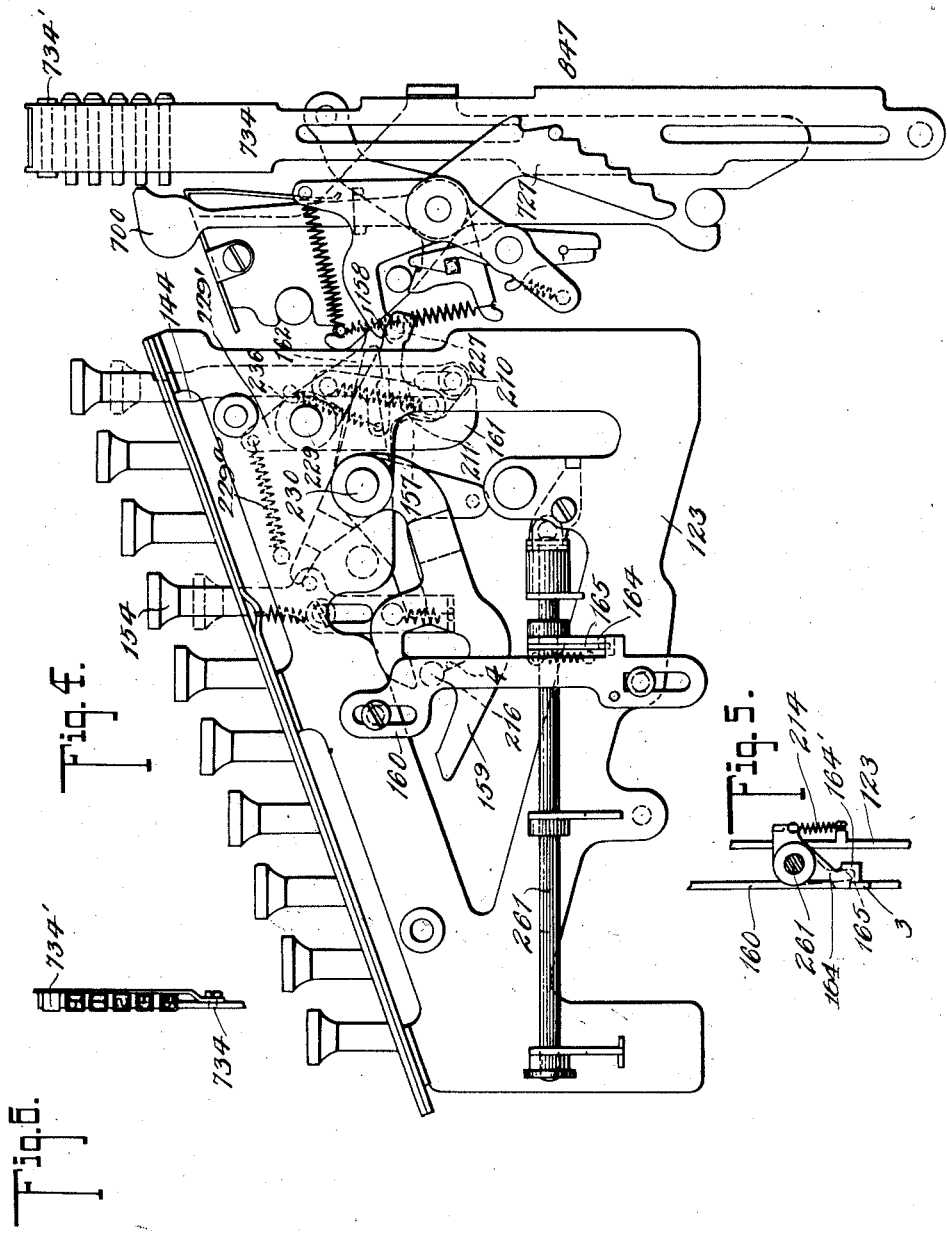

A. E. SORUM & R. T. BROCKMAN.
REGISTERING AND MONEY PAYING MACHINE.
APPLICATION FILED AUG. 3, 1914.
1,257,143.
Patented Feb. 19, 1918.
11 SHEETS—SHEET 5.
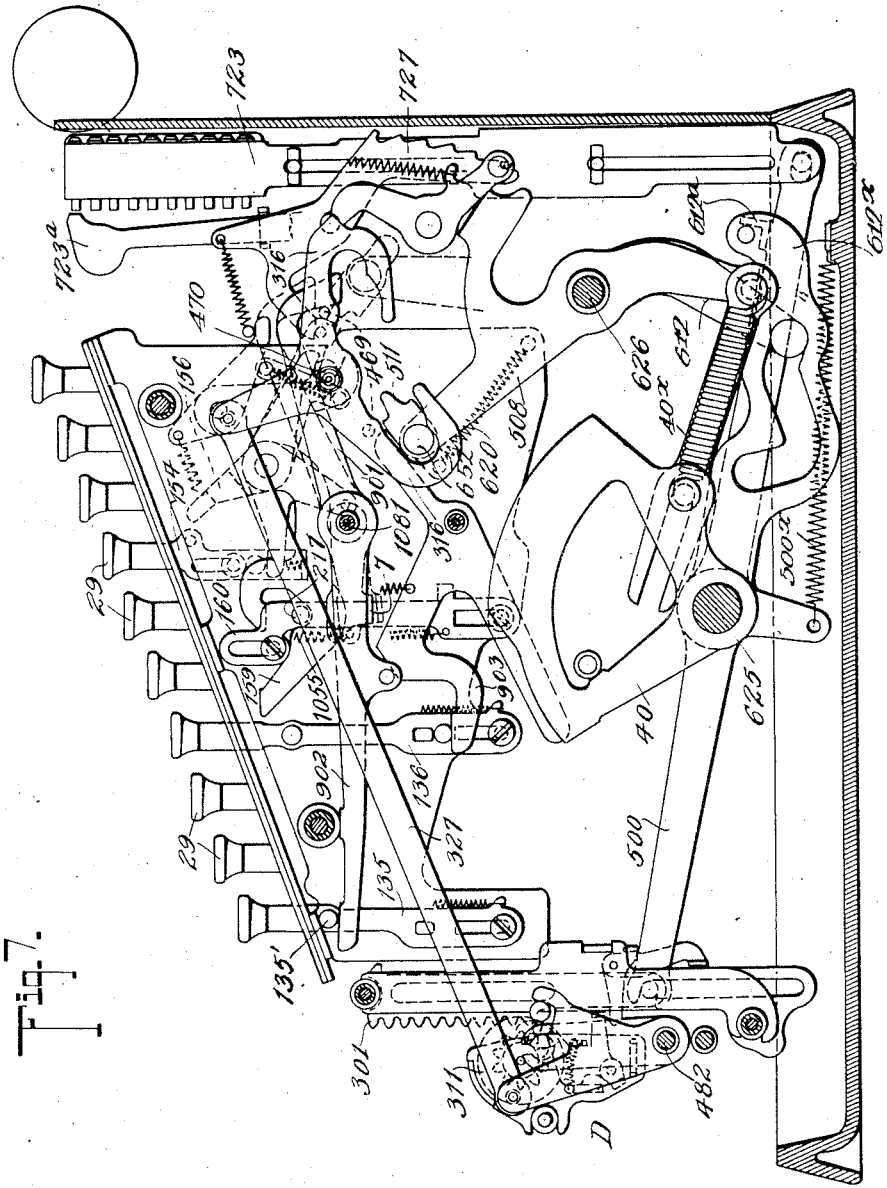

A. E. SORUM & R. T. BROCKMAN.
REGISTERING AND MONEY PAYING MACHINE.
APPLICATION FILED AUG. 3, 1914.
1,257,143.
Patented Feb. 19, 1918.
11 SHEETS—SHEET 6.
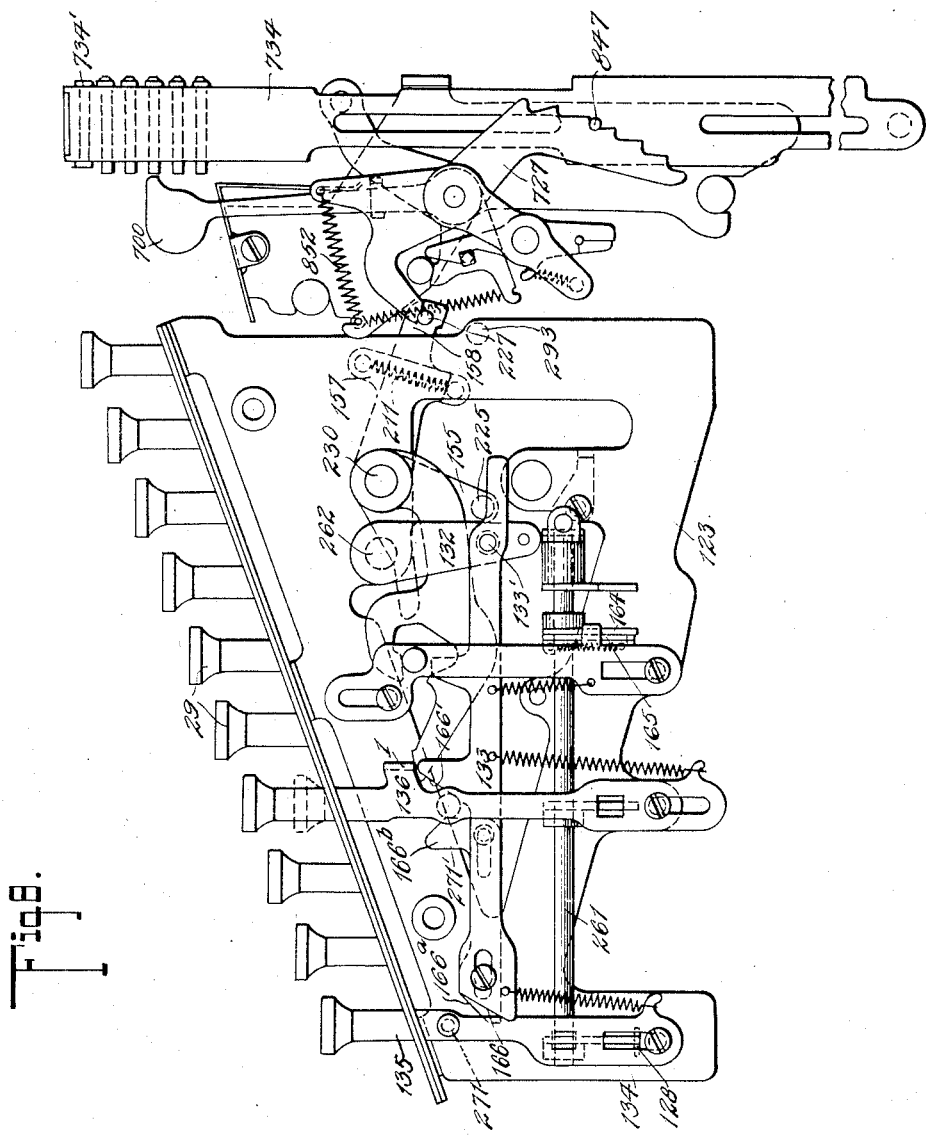
Fig.8.
WITNESSES:
INVENTORS
BY
ATTORNEY A. E. SORUM & R. T. BROCKMAN.
REGISTERING AND MONEY PAYING MACHINE.
APPLICATION FILED AUG. 3, 1914.
1,257,143.
Patented Feb. 19, 1918.
11 SHEETS—SHEET 7.
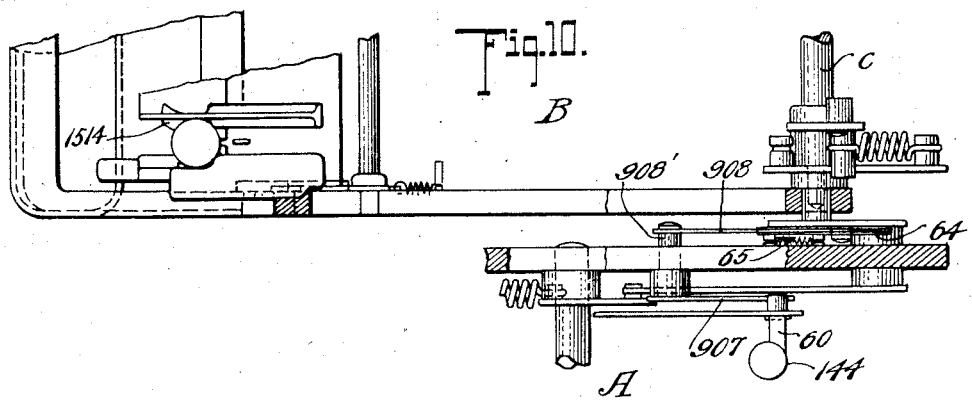
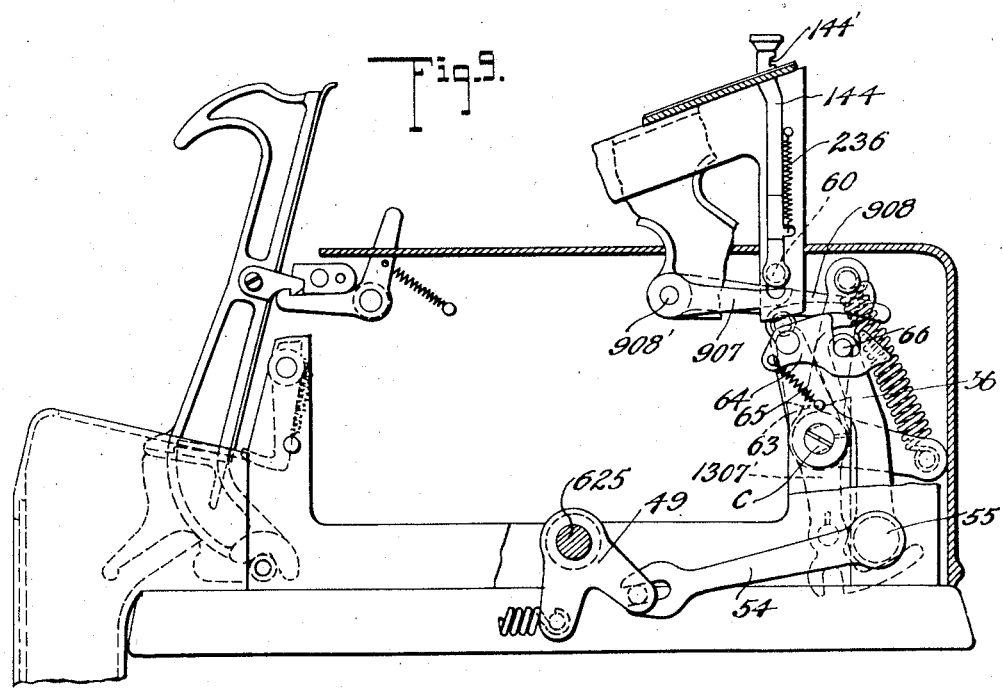
WITNESSES:
INVENTORS
BY
ATTORNEY

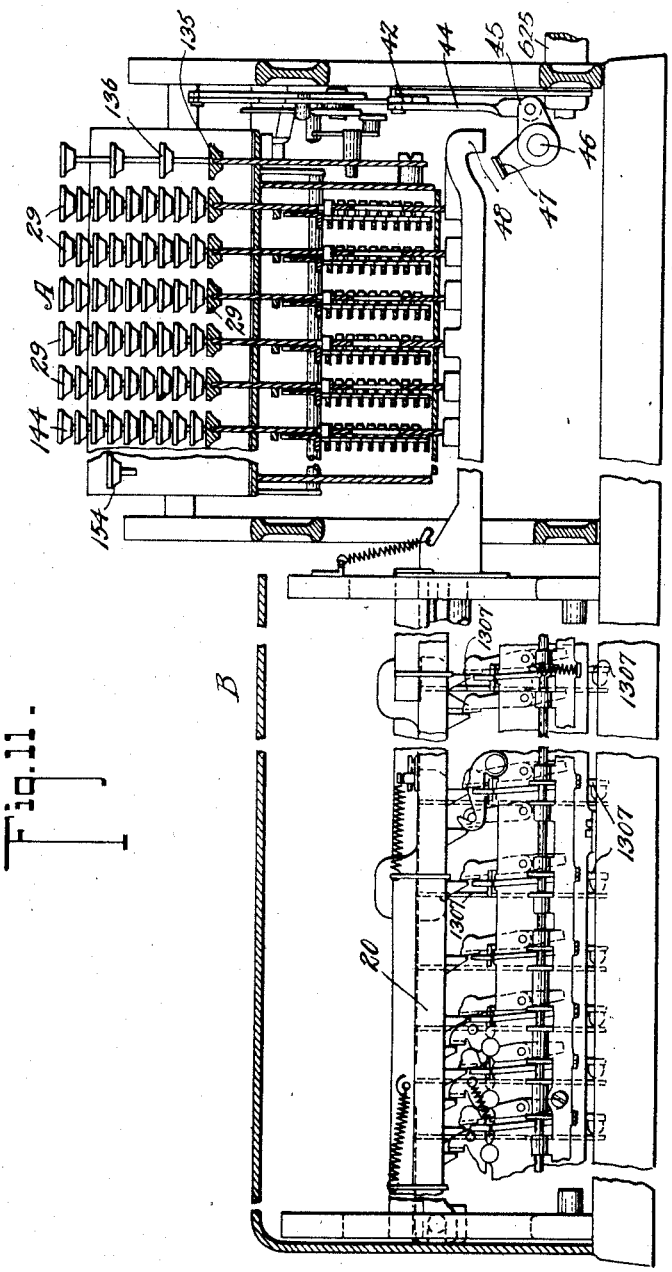

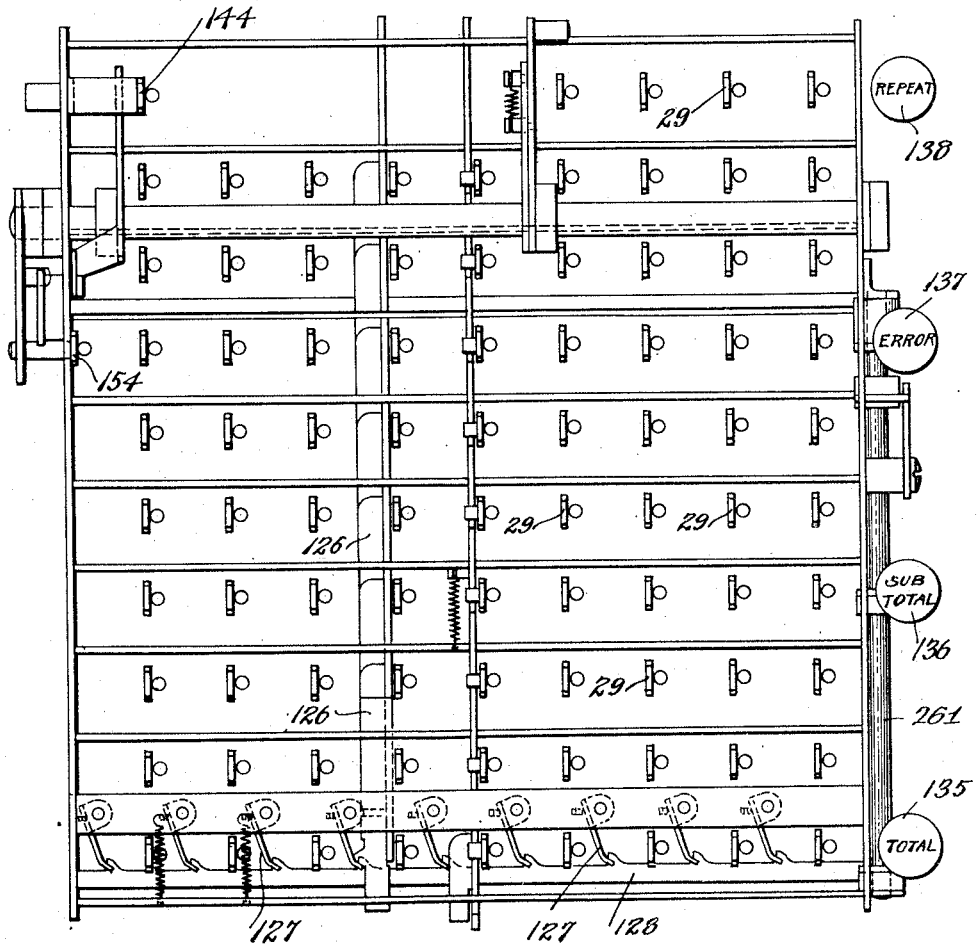

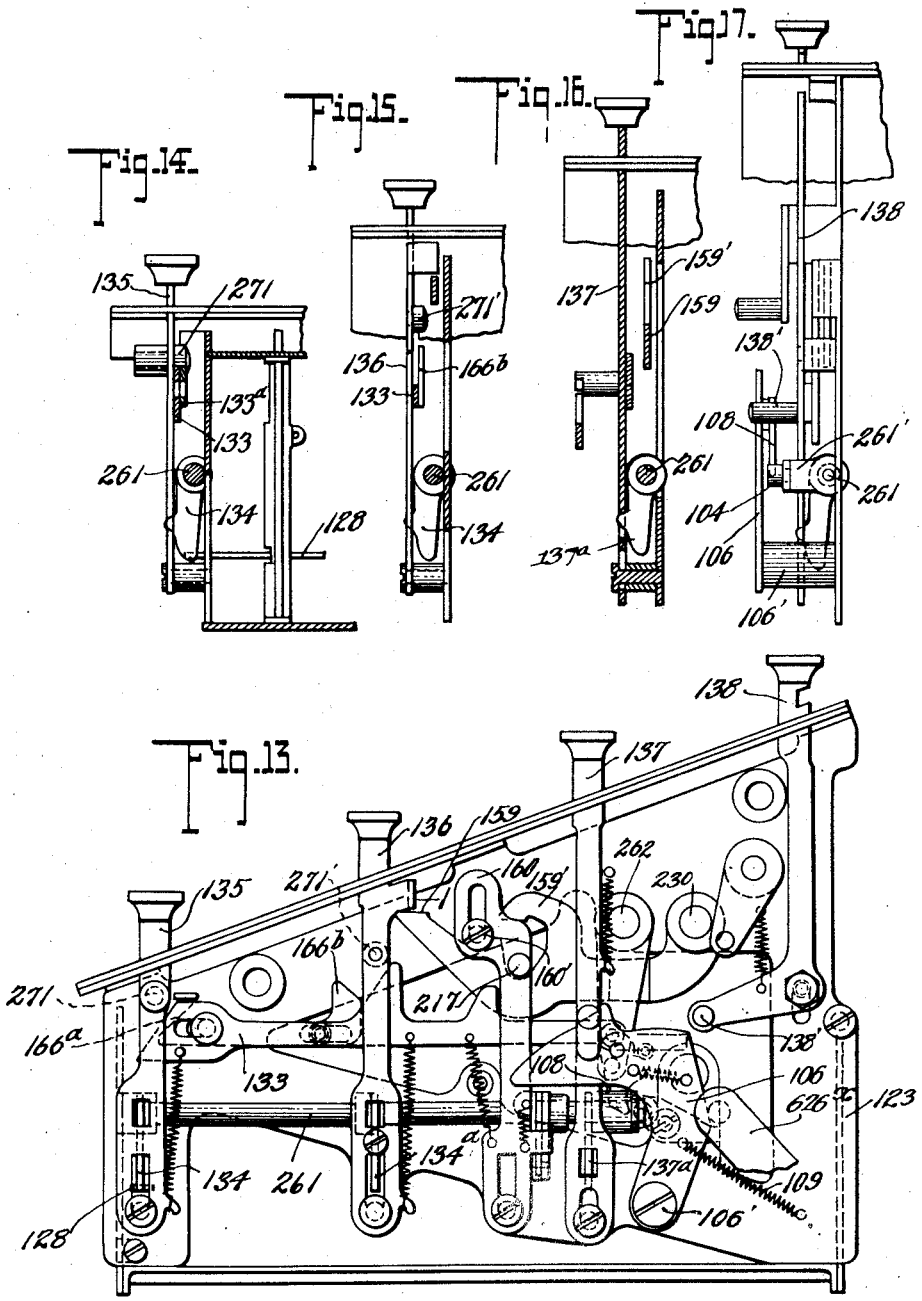

A. E. SORUM & R. T. BROCKMAN.
REGISTERING AND MONEY PAYING MACHINE.
APPLICATION FILED AUG. 3, 1914.
1,257,143.
Patented Feb. 19, 1918.
11 SHEETS—SHEET 11.
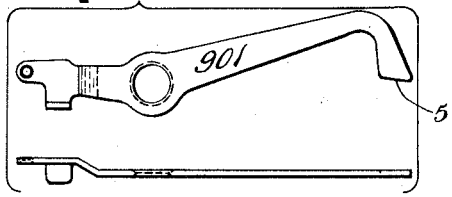
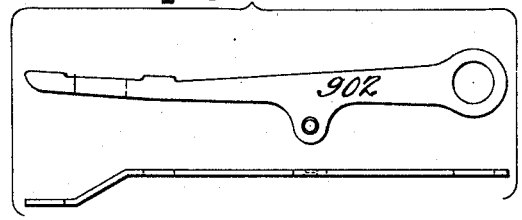
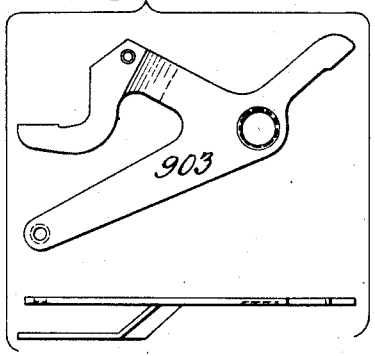
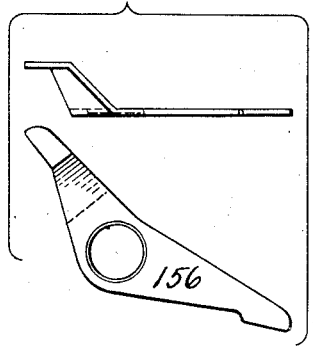
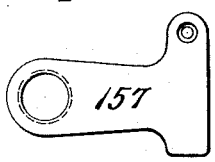
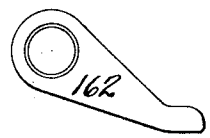
Witnesses
E. H. Wagner,
D. R. Partello.
Inventor
A. E. Sorum
R. T. Brockman
By
Attorney

UNITED STATES PATENT OFFICE.

ALEXANDER E. SORUM AND ROBERT T. BROCKMAN, OF TERRE HAUTE, INDIANA, ASSIGNORS TO INTERNATIONAL MONEY MACHINE COMPANY, OF TERRE HAUTE, INDIANA.

REGISTERING AND MONEY-PAYING MACHINE.

1,257,143.

Specification of Letters Patent.

Patented Feb. 19, 1918.

Application filed August 3, 1914. Serial No. 854,836.

*To all whom it may concern:*

Be it known that we, ALEXANDER E. SORUM and ROBERT T. BROCKMAN, citizens of the United States, residing at Terre Haute, in the county of Vigo and State of Indiana, have invented certain new and useful Improvements in Registering and Money-Paying Machines, of which the following is a specification.

This invention comprises certain improvements in the combined adding and money paying machine set forth in the copending application of White, Bullington and Overlin, Serial Number 702,164, filed June 7th, 1912, and also British Letters Patent No. 28,084 of 1912. The aforesaid machine consists primarily of a complete adding machine associated with a money paying mechanism, there being suitable means, such for instance as a "non-pay" key or manipulative device whereby said adding machine and the paying mechanism may be controlled for conjoint operation, or the adding machine operated alone for the ordinary purposes for which machines of this class are very commonly employed today.

The improvements of this invention have to do particularly with the characterization of items capable of being listed or recorded by the machine of the application above identified. Owing to the fact that said machine is capable of paying out money under the control of the manipulative devices for the adding machine, as well as capable of operations utilizing the adding machine alone, it is highly desirable that there be a method of indicating clearly which items set up in the machine represent amounts of money paid out, and which items represent amounts of transactions not involving the operation of the money paying mechanism. The result of characterizing the items set up in the machine whereby to differentiate those involving the paying out of money and those unaccompanied by a money transaction, is effected by the employment of suitable printing mechanism under the direct control of the manipulative device or key by which the paying mechanism is disabled or rendered operative at will.

In addition to the foregoing the printing mechanism used for the characterization of pay and non-pay items set up in the machine of said co-pending application is also constructed with a view to obtaining other characterizations of items such as totals, sub-totals and those items not accumulated, or known in this particular art as "eliminated" items.

The present invention also involves the provision of special mechanism for rendering the accumulating instrumentalities inactive for the customary purpose of eliminating items set up in the machine at the will of the operator. Suitable characterization of eliminated items is provided for advising whether such items are incident to transactions of the adding machine section alone, or incident to combined operation of the adding machine and the paying mechanism.

The invention not only resides in the foregoing features of construction and operation but also in other detail features, such for instance as the provision of peculiar means for locking the non-add, total and sub-total keys depressed under certain conditions of adjustment of the mechanism and until prearranged coöperations of various parts are completed, there being other details of structure essentially novel within the scope of the present invention, and all of which will be fully pointed out in the following description in connection with the accompanying drawings, in which—

Figure 1 is a general top plan view partly broken away, illustrating a combined adding and money paying machine constructed in accordance with the present invention.

Fig. 2 is a side view of the controlling mechanism showing the printing means adjusted as when printing the characterization "P" indicative of the fact that the items set up in the machine are accompanied by the payment of money to the amount of said items.

Fig. 3 illustrates in side view the controlling mechanism for setting the printing or characterization devices for the printing of items which are not accumulated by the accumulator of the adding machine but which are representative of amounts of money paid out.

Fig. 4 is a view similar to Fig. 3 but illustrating the adjustment of the controlling mechanism for printing the characterizing designation "E" alongside an item recorded by means of the machine.

Fig. 5 is a detail view showing more clearly the means for locking the non-add key depressed.

Fig. 6 is a fragmentary view of the characterizing or special type carrier illustrating the different types mounted therein.

Fig. 7 is a general side view of the control mechanism for the accumulator section of the adding machine illustrating certain changes made therein as compared with the corresponding construction in the co-pending application previously referred to, whereby to adapt the characterizing mechanism to the machine.

Fig. 8 is a view similar to Figs. 3 and 4 showing the type carrier adjusted to a position assumed thereby when four increments of movement are imparted thereto, controlled by the sub-total key, the special hammer for the special type carrier being illustrated as acting on the sub-total designating type.

Fig. 9 is a view supplementing Fig. 1 to the extent of showing more clearly the means for disabling the paying section of the machine and simultaneously controlling the action of the special type carrier.

Fig. 10 is a top plan view of the parts shown in Fig. 9.

Fig. 11 is a fragmentary front view bringing out more fully the relation of the selectors, amount keys and ejectors controlled by the selectors.

Fig. 12 is a plan view of the keyboard mechanism with finger-pieces of keys omitted, certain index plates omitted, and the key locking plates clearly shown with other details.

Fig. 13 is a side view of the special keys and coacting mechanism.

Figs. 14, 15, 16 and 17 are sectional views of the total, sub-total, error and repeat key devices, respectively.

Figs. 18 to 23 inclusive are detail views of certain levers and arms forming controlling devices of the characterization mechanism and which parts are combinatively illustrated in several of the figures of the drawings.

Many of the general features of the machine embodying the improvements of this invention need not be described in detail since they form no part of the invention and are quite fully presented in the co-pending application hereinbefore referred to.

*General construction of the adding machine.*

Fig. 1 shows in a general way by a fragmentary view an adding machine and combined paying mechanism, the adding section being denoted A and the paying section B. The machine is of the hand operated type of U. S. Letters Patent to White No. 1,192,721 issued July 25, 1916, the main actuator consisting of a handle 501 which is supported by the actuator shaft 625 (see Fig. 7). The adding machine comprises the usual keyboard embodying a suitable number of rows of amount keys 29 which rows of keys may be duplicated to any desired extent, with their accompanying controlling instrumentalities whereby to increase the capacity of the machine in the well known manner. The accumulator of the adding machine is located at the front of the adding section A so that the registrations of the adding wheels may be viewed through the observation openings *a*. The amount keys 29 control the indexing mechanism for the accumulating and printing instrumentalities, in any well known manner, said indexing mechanism not being shown though the accumulating and printing devices are disclosed in a general way in Fig. 7 of the drawings. As seen in Fig. 1, a number of special keys are used in the keyboard section A, including a "repeat" key having the indicia "R" thereon; an "error" key with the indicia "E" thereon; a "sub-total" key with the indicia "S" thereon and designated by 136; a "total" key with the indicia "T" thereon and designated by 135; a paying section disabling key designated 144 and marked "Non-pay"; and an accumulator disabling key designated 154 and marked "Non-add". Of these special keys the "repeat" and "error" keys operate in any conventional manner not to be described in detail, while the other keys 135, 136, 144 and 154 have a double function owing to the fact that they control characterization of items as well as perform the function for which each is especially provided.

The paying section of the machine incompletely illustrated at the left in Fig. 1 comprises coin holders 1513 and 1514, suitable ejectors 1307 being arranged to discharge coins from said holders and being disposed normally in inoperative positions in respect to ejector arms 1307' carried by the ejector shaft C. At their rear ends the ejectors 1307 have lateral pins or studs to enter notches in the arms 1307' whereby to operatively connect the ejectors with the ejector shaft C so that on rocking of the latter shaft a selected ejector or ejectors may be operated. The selection of the ejectors is accomplished by the means generally shown in Figs. 1 and 11 from which it will be noted that the keys 29 are engageable with selectors 20 to render said selectors operative on depression of said keys. The selectors are adapted to shift the ejectors 1307 into operative connection with the ejector arms 1307', during the initial movement of the handle 501, the actuation of the selectors being accomplished by their depression to engage hooks 48 at one end of the selectors with an operating bail 47 on a shaft 46 which is operable from the handle shaft 625 through the medium of a lever 42 and link 44 attached to an arm 45. This coöperation of parts is fully presented in the preceding application to which reference has been made.

Disablement of paying mechanism.

When the non-pay key 144 is in its normal position, every time the handle 501 is actuated for a transaction of the machine the movement of the handle shaft 625 is communicated to the ejector shaft C through the medium of a spring retracted arm 49 carried by the shaft 625 and arranged to operate a bifurcated arm 54 on an auxiliary shaft 55. The shaft 55 carries still another arm 56 located between the adding and paying sections of the machine and a stud 66 on the arm 56 is normally engaged by a hook 64 yieldingly held in such engagement by a spring 65 (see Fig. 9). The hook 64 is carried by an arm 63 on the ejector shaft C and above the hook 64 is an arm 908 supported by a stub shaft 908' mounted in the left frame or wall of the adding section A of the machine. On the inner end of the stub shaft 908' is carried another arm 907 adapted to be depressed by a pin 60 which projects laterally from the lower end of the non-pay key 144, the latter being held up by a spring 236. Obviously by depressing the key 144 the arms 907 and 908 will be lowered and the latter will engage the hook 64 and depress the same sufficiently to free the stud 66 therefrom, whereby the motion transmitted to the arm 56 from the shaft 39 will not operate the arm 63 and the ejector shaft C supporting the same. Under these conditions, depression of the key 144 effects a discontinuance of the operation of the paying section B during the transactions set up in the adding section A, the key 144 being adapted to be held depressed by a notch 144' formed therein and capable of engaging the top plate of the adding section.

Accumulating and printing mechanism.

Since the accumulating and printing devices are practically the same as in the application hereinbefore identified they will only be referred to in a brief way with a view to establishing thoroughly the coöperation of the various mechanisms of the machine. Reference is made to Fig. 7 wherein the accumulator is shown at D, being carried by the shaft 482 and having suitable adding wheels 311. The accumulator is shiftable as customary to engage its adding pinions with the adding racks 301, by means of the rod 327 which connects the accumulator with the three-armed control lever 316. The lever 316 is adapted to be rocked differentially, so to speak, whereby to cause the adding pinions of the wheels 311 to become meshed with the teeth of the racks 301 at different times, in respect to the excursions of the racks, whereby to cause regular accumulation of items by the wheels 311, and to control the taking of totals and sub-totals when the keys 135 and 136 are operated respectively, the general coaction of the parts 301 and 311 being well known in this art. The movement of the lever 316 is effected through the medium of an operating lever 508 carrying the roller 652 at its upper end as well as the wipe pawl 511. The lever 508 is mounted on the shaft 626 and is moved through an intermediate connection with a cam 40 carried by the shaft 625. In its movement with the lever 508 the wipe pawl 511 is adapted to engage pins 469 on opposite arms of the lever 316, under the control of a main total lever 902, and an auxiliary total lever 901, and also under the control of a sub-total lever 903. The parts 901 and 902 are equivalent to a single total lever employed in the machine of the co-pending application No. 702,164, and Letters Patent No. 1,192,721 issued July 25, 1916, on a continuing application, the modification in this detail of construction having been made with a view to facilitating disablement of the accumulator on the depression of the non-add key 154. On the other hand, the sub-total lever 903 acts substantially the same as in the previous machine above referred to. The detail operation of these parts in the performance of the new functions obtained in the present invention will be set forth hereinafter.

As apparent by reference to Fig. 7, a suitable number of type carriers 723 is provided, each carrier having type numbered from 1 to 9 inclusive adapted to be impinged in the well known manner by hammers 723ᵃ associated therewith, the hammers being fired at a predetermined time during the movement of the main actuator of the machine.

The type carriers 723 and the adding racks 301 are connected together by means of the levers 500 so that the movement of these parts is controlled by the indexing mechanism when the latter has been set by depressing the keys 29.

This general operation of type carriers and adding racks is the same broadly as in all Burroughs type adding machines. As the handle shaft 625 is moved, the movement is transmitted through the cam 40 and flexible connection 40ˣ to the lever 508 which is mounted on the shaft 626 (see Fig. 7). The shaft 626 carries the arms 612 that move therewith and these arms 612 coact with slotted portions of arms 612ˣ loosely mounted on the main shaft 625. Upraising of the arms 612ˣ relieves the rear ends of the levers 500 of the downward pressure of a detent bar 612ᵃ which connects the arms 612ˣ together. Thereupon certain springs 500ˣ connected with arms 500' projecting from the levers 500 rock the now released levers and cause the same to move the adding racks 301 downward and raise the type carriers 723 in the usual manner.

The special type carrier.

In addition to the regular type carriers 723 previously referred to, there is provided a special type carrier 734 (see Figs. 2, 3, 4, 7 and 8). The type carrier 734 is vertically yieldable and quite generally the same in construction as the carriers 723 except in respect to the number of type, five only of the latter being employed and having the characters shown quite plainly in Fig. 6, namely a letter "P" for characterizing each paid item, as for instance 934,128-P; a letter "T" for characterizing a grand total, as for example 347,899-T; a letter "S" to characterize a sub-total, thus, 256,438-S; a letter "E" for designating each eliminated item set up in the machine, in this manner: 281,473-E; and finally a double character "E P" to be printed for items which are not accumulated but which represent amounts paid out, as for example 478,825-E P. Of course the items which are not added will not be carried in the totals, this having to do with the characterizations "E" and "E P."

A special indexing device is employed for indexing the special type carrier 734 for the printing of any one of its types, and for indexing said type carrier in a position wherein a blank type 734' is opposite the hammer 700 that coöperates with the type carrier 734, under which conditions no characterization of the item set up in the machine is afforded. Non-characterized items will therefore be understood to be those ordinarily accumulated during the normal operation of the adding machine when used independently of the paying mechanism.

The special indexing device mentioned comprises a sector 727 provided with six notches corresponding with the characterization and blank types of the carrier 734. On the carrier 734 is a pin 847 capable of engaging with the sector 727 at any of the notches formed in the latter, a differential movement of the special carrier 734 being controlled by merely varying the position of the sector 727 in an obvious manner. The movement of the sector 727 is controlled by the several special keys 135, 136, 144 and 154 in a manner which will now be set forth in detail.

Sub-total characterization operation—Fig. 8.

Bearing in mind the relative arrangement of the character types on the special type carrier 734, as disclosed by Fig. 6, a depression of the sub-total key 136 causes a lug 1 offstanding from said key to engage and depress a lever 159 fixed on the shaft 230 which is mounted in suitable bearings in the side plates 123 of the adding section A. The shaft 230 has a fixed arm 157 extending opposite from the lever 159 and connected to an arm 158 by means of a spring 211, said arm 158 having a stud 227 capable of engaging the upper end or arm of the indexing sector 727. As shown in Fig. 8, the sector 727 is adjusted so that the characterization type S of the same is opposite the hammer 700 in position for printing the sub-total character, the pin or stud 847 of the carrier 734 having permitted four increments of movement of the carrier upward in the positioning operation. The printing of each character of the type carrier 734 is accomplished simultaneously with the printing of the items, and by the same printing mechanism as is used for the latter, as before premised. A spring 852 is utilized to hold the sector 727 in contact with the stud 227 of the arm 158 and said spring also normalizes the shaft 230 and the members thereon, the movement under such conditions being governed by engagement of the arm 158 with a shaft 293.

Grand total characterizing operation—Fig. 8.

The characterization of grand totals is controlled by the total key 135 in a manner similar to the control of the sub-total characterization by the corresponding key 136. When the total key 135 is operated for the taking of a regular total from the machine, a stud 271 on said key engages a cam 166 of a horizontally slidable link 133 and forces said link longitudinally toward the rear of the machine. The link 133 is connected at 133' to a depending arm 132 on the shaft 262 and the arm 132 is adapted to impinge a stud 225 carried by an arm 155 which is also fixed on the shaft 230. It will therefore be apparent that the shifting of the link 133 rearwardly by the key 135 oscillates the shaft 230 and sets the index sector in the same manner as effected by the sub-total key, except only that the movement of the shaft 230 is less and therefore the third notch of the sector 727, counting downwardly, will be indexed for engagement by the stud 847 and the characterization type "T" will be operated by the hammer 700 in the printing operation, properly characterizing the grand total. The link 133 has an auxiliary cam 166' engageable by a stud 271' of the sub-total key, so that said link is also operated when the sub-total key is actuated, in a manner similar to the movement of the link by the total key 135.

The item characterizing operation—Fig. 2.

In this figure the indexing sector 727 and certain directly associated parts are illustrated by dotted lines in their normal positions and in full lines as when adjusted for the indexing of the "P" characterization indicating that the items set up in the machine with the parts so adjusted represent amounts paid out as well as items accumulated in the regular operation of the adding mechanism.

The non-pay key 144 has a stud 210 at the lower end of its stem and on depressing said key and locking it depressed by means of the notch 144' the money paying mechanism is disabled. With such adjustment of the key 144 the adding machine operates independently of the paying mechanism, practically as an ordinary adding machine, and at this time the items printed in the machine will be non-characterized owing to the fact that the special type carrier 734 will be indexed by the sector 727 occupying its dotted line position in Fig. 2 and maintaining the hammer 700 opposite the blank type 734' of said carrier. This action of the machine, it will be understood, is secured by the depression of the key 144 to the dotted line position of Fig. 2. When said key 144 is released, however, so as to move into its full line position the stud 210 engages the arm 156 of the shaft 230 and oscillates said shaft, thereby moving the arm 158 which carries the stud 227, upward one increment of movement. This movement of the arm 158 sets the indexing sector 727 to its full line position of Fig. 2, permitting the type carrier 734 to have a single increment of movement upward in the printing operation whereby the hammer 700 will strike the character type P. In this way the upraised position of the key 144 rendering the paying mechanism operable causes an adjustment of the indexing sector that will characterize the items with the character P so long as the said position of the non-pay key 144 is maintained and so long as the non-add key 154 also remains undepressed.

*Eliminated and paid item characterizing operation—Fig. 3.*

A depression of the non-add key 154 causes a stud 228 on said key to engage the arm 155 fixed on the shaft 230 thereby oscillating the shaft and elevating the arm 158 in the manner hereinbefore described so as to raise the stud 227 high enough to adjust the sector 727 to a position wherein the stud 847 of the special type carrier 734 will engage the uppermost of the notches of the sector. In this manner the type carrier will be indexed so as to characterize the items set up in the machine with the characterization "E P" meaning that said items were not accumulated by the adding mechanism but represent amounts paid out by the paying mechanism. Under these conditions, of course, the non-pay key 144 is upraised and the machine is operating as a combination paying and adding machine, with the exception that the accumulating mechanism is inactive.

*Eliminated item characterizing operation— Fig. 4.*

Assuming that the parts are in the positions shown in Fig. 3, if it is desired to operate the adding machine alone, by which is meant independently of the paying mechanism, and at the same time render the accumulator of the adding machine inactive, the non-add key 154 will remain depressed as shown in Fig. 3 but the non-pay key 144 will be depressed, whereas in the positions of the parts in Fig. 3, said key 144 was upraised. Referring to Fig. 4 it will be observed that the depression of the non-pay key 144 causes the stud 210 above mentioned to engage the cam surface on an arm 161 which is fixed to a shaft 229. A short arm 229' on the shaft 229 is connected to a spring 229ª which tends to turn said shaft and certain arms fixed thereto, in a contra-clockwise direction. The shaft 229 is in this way oscillated, being supported in bearings in the side plates 123. Said shaft 229 has another arm 162 in a position to engage the stud 227 of the arm 158 and the movement of the key 144 causes this particular engagement in such a manner as to force the arm 162 downward to an extent permitting one increment of movement outward to the sector 727, the latter responding to the action of the spring 852. The movement of the arm 162 downward, as above described, imparts corresponding movement to the arm 158, stretching the spring 211 which connects the arm 158 with the arm 157, the latter parts being seen best in Fig. 8. In this way the sector 727 is positioned so that the second from the topmost notch of the sector will engage the stud 847 to position the special type carrier 734 for action of the hammer 700 on the second from the lowermost type which has the eliminated item characterization "E".

The discontinuance of the operation of the accumulator is effected by disengaging the adding pinions of the wheels 311 from the racks 301 before said racks start to return upward, and reference is to be had to Fig. 7 in this particular connection. When the non-add key 154 is depressed a stud 217 fixed on the slide 160 engages the lever 901 which as previously mentioned is the auxiliary total lever. The lever 901 is thus oscillated about its pivot 1081 so as to assume the position shown in dotted lines in Fig. 7. When in such position it will be apparent that the wipe pawl 511 which was previously and is normally held out of engagement with both of the studs 469 on the lower arms of the lever 316 will now engage with the right hand of said studs so that on the return stroke of the machine the adding pinions, having been brought into mesh with the racks 301 will be forced out of mesh with said racks, allowing the latter to return to normal position without performing their regular adding operation. The control of the accumulator D by the total key 135 is practically the same in the present machine as in respect to the machine of the hereinbefore identified application because as the total key 135 is lowered the stud 135' thereon strikes the total lever 902 and the latter depresses the front end of the auxiliary lever 901 owing to the fact that the latter has a laterally bent lug 7 extending beneath the lever 902. In other words, so far as the operation of the total key 135 is concerned, affecting the parts 901 and 902, these parts might just as well be unitary or integral, their separation into two levers being made solely to afford an independent action of the lever 901 under the influence of the non-add key 154. A spring 1055 connected with the front end of the lever 901 tends to hold the latter in the full line position of Fig. 7 with the surface 5 on the rear end of the lever in the path of the wipe pawl 511. Lever 902 is also returned to its normal position by the spring 1055.

*Amount key release and total key lock mechanism.*

It is requisite in a machine of the type of this invention that the operation of the total or sub-total keys effect a release of the item or amount keys 29 of the keyboard, and that when operated the total and sub-total keys be locked depressed. The mechanism for this purpose is shown in Figs. 3, 12 and 13, and comprises a shaft 261 (see also Fig. 5) said shaft having arms 134 thereon. Depression of the non-add key 154 causes oscillation of the shaft 230 in the manner before described through the medium of the arm 155. The movement of the arm 155 causes the arm 156 of shaft 230 to move over the stud 208 on the non-add key so as to prevent the return or normalizing of said key until after the shaft 230 is released, but the shaft 230 is retained in its oscillated position by a lever 159 which has a curved arm 159' adapted to engage over stud 216, thereby lowering a slide 160 mounted on suitable guiding members 160' on the plate 123. The slide 160 is locked down by a lug on the locking arm 164 which is loose on the shaft 261, said lug engaging over a lug 3 on the slide 160.

In the ordinary operation of the machine during the latter part of the forward stroke of the handle 501, roller 652 (see Fig. 7) engages the cam surface of the right arm of the lever 316 thereby oscillating the latter on the axis 470. This causes the pinions of the accumulator D to mesh with the adding racks 301 which are in their lowermost position at this time. On the return stroke of the handle the regular adding operation takes place at the end of which the accumulating section is thrown out of mesh with the adding racks 301 by engagement of the roller 652 with the cam surface of the left arm of the lever 316, in a manner which will be clearly understood by those versed in this art.

Adjacent to the front end of the link 133 there is located the slide 133ª which is longer than the distance between the studs 271, 271' on the total and sub-total keys respectively. The slide 133ª has a cam 166ª at its front end and a cam extension 166ᵇ at its rear end, the latter inclining oppositely to the cam 166' of the link 133.

Owing to the length of the slide 133ª the total key 135 and sub-total key 136 cannot be simultaneously fully depressed as the cams 166ª and 166ᵇ form abutments preventing this action. When, however, the total key is depressed the stud 271 acts on both the cam 166ª and cam 166 moving the link 133 and slide 133ª rearward together to set the sector 727 for proper characterization, said slide 133ª being positioned with its cam extension 166ᵇ capable of preventing depression of the sub-total key while the total key is down.

In like manner, if sub-total key 136 be depressed the slide 133ª will be moved forward bringing its front end cam 166ª below stud 271 of the total key and preventing the latter from being depressed while the sub-total key is down. Under these conditions it is rendered impossible while the sub-total key 136 is depressed to depress the total key and thereby effect a total characterization.

The amount keys are adapted to be released by operation of the total key 135 or the sub-total key 136, or the correction or error key 137. As seen in Fig. 13, when the total key 135 is depressed the catch 134 fixed on the shaft 261 is rocked inward, see also Fig. 14, until the nib of the catch enters the locking opening at the lower end of the key to hold the latter in its depressed position. This rocking of the catch 134 causes a release of the various amount keys owing to the fact that the catch 134 engages at its lower end with the key release bar 128 sliding the latter transversely of the keyboard, see Fig. 12, and causing the movement of the various locking plates 127 which coöperate with the index slides or members, a series of which are shown at 126 in Fig. 12. This operation is quite similar to that employed in the machine of the Letters Patent previously referred to. It will be apparent that on depressing the sub-total key 136 the catch 134ª of shaft 261 is adapted to lock the key 136 depressed and to release the amount keys 29 in the same manner as described in relation to the key 135. Furthermore, should the key 135 have been depressed previous to the operation of the key 136, and before actuating the handle 501, said key 135 would be restored by the depression of key 136. The operation would be vice versa in event of initial depression of the key 136 and subsequent depression of the key 135. The correction or error key 137 operates on an arm 137$^a$ caried by the shaft 261, see Figs. 13 and 16, for the purpose of rocking the shaft 261 and effecting the release of the amount keys 29 or the keys 135 and 136 as the case may be.

It is necessary, of course, that the amount keys 29 be restored at the end of an ordinary transaction of the machine accumulating or printing an item. With this in view a tripping arm 106 is pivoted at 106′, see Fig. 13, to a frame plate of the keyboard section and said arm carries a spring actuated tripping pawl 108 capable of engaging a roller 104 carried by a lateral arm 261′ on the shaft 261. The tripping arm 106 is normally pulled rearward by a spring 109 and on the return stroke of the handle 501 an arm 626$^x$, mounted on the shaft 626, see Fig. 7, permits the tripping arm 106 to move rearward carrying with it pawl 108. Said pawl in such movement forces the lateral arm 261′ downward by engaging the roller 104 thereof and the tilting of the shaft 261 by this operation causes the catch 134 to effect key release movement of the release bar 128. This whole operation is similar to the operation of certain corresponding parts fully presented in the Letters Patent hereinbefore referred to. As seen in Fig. 13, a repeat key 138 is utilized and when depressed a stud 138′ thereon engages in rear of the arm 106 and prevents the latter from moving during the operation of the handle 501 so that the previously depressed keys of the keyboard are not released and the transaction controlled thereby will be repeated owing to this condition.

During the ordinary operation of the machine the shaft 261 is oscillated on the return stroke of the handle 501 and when this occurs the arm 165 which is fixed on the shaft 261 engages a bent over lug 164′ on the arm 164, thereby releasing the slide 160 permitting the latter to be normalized by the spring 215. The lever 159 is retained in set position by the projection 4 thereof contacting with the under side of the stud 216 thereby preventing restoration of the shaft 230 and maintaining the key 154 depressed in the manner hereinbefore suggested.

Having thus described the invention, what is claimed as new is:—

1. In a machine of the class described, the combination of accumulating and listing mechanisms, the latter mechanism including a special type carrier for characterization of items listed, an indexing device for said type carrier, and means controlling the setting of said indexing device including a key, a shaft, an arm on said shaft coacting with said indexing device, means intermediate said arm and said key whereby the arm may be shifted to set the indexing device in a predetermined position, a second key, and an arm on said shaft operable by the second key for actuating the shaft to position the indexing device in a second predetermined position, and means whereby the said keys are adapted to control special operations of the accumulating mechanism.

2. In a machine of the class described, the combination of accumulating and listing mechanisms, the latter mechanism including a special type carrier for characterization of items listed, an indexing device for said type carrier, means controlling the setting of said indexing device including a key, a shaft, an arm on said shaft coacting with said indexing device, means intermediate said arm and said key whereby the arm may be shifted to set the indexing device in a predetermined position, a second key, the said means intermediate the first named key and said shaft having a member operable by the second named key whereby a double actuating connection between the latter key and the indexing device is provided, and means whereby the said keys control special action of the accumulating mechanism.

3. In a machine of the class described, the combination of accumulating and listing mechanisms, the latter including a special type carrier for characterization of items listed, an indexing device for said type carrier, total and sub-total keys, an operating connection intermediate each of said keys and the indexing device, and means whereby both the operating connections between the keys and the indexing device are adapted to be operated by one of the keys.

4. In a machine of the class described, the combination of accumulating and listing mechanisms, the latter including a special type carrier for characterization of items listed, an indexing device, total and sub-total keys controlling the accumulating mechanism, an operating connection between the sub-total key and the indexing device for positioning the latter at a predetermined adjustment, an operating connection intermediate the total key and the indexing device whereby to position the latter at a second predetermined adjustment, the last mentioned operating connection including a member adapted to be operated by the sub-total key so that on actuation of the latter the operating connections between both the sub-total and total keys and the indexing device will be operated.

5. In a machine of the class described, the combination of accumulating and listing mechanisms, the latter including a special type carrier for characterization of items listed, an indexing device, a shaft, an arm on said shaft having means engaging the indexing device for actuating the latter, a second arm on said shaft yieldably connected with the first arm, a special key for controlling special action of the accumulating mechanism, and means intermediate said special key and the second mentioned arm for operating the latter and thereby shifting the first mentioned arm to position to move the indexing device to a predetermined position.

6. In a machine of the class described, the combination of accumulating and listing mechanisms, the latter including a special type carrier for characterization of items listed, an indexing device, a shaft, an arm on said shaft having means engaging the indexing device to actuate the latter, a second arm yieldably connected with said first arm, a key for controlling special action of the accumulating mechanism operatively connected with the second arm for shifting the same and thereby shifting the first arm, and means to directly actuate the first arm for positioning the indexing device at a predetermined adjustment.

7. In a machine of the class described, the combination of a printing and listing mechanism, the latter including a special type carrier for characterization purposes, an indexing device controlling the positioning of the said special type carrier at different adjustments, the shaft 230, the arm 158 on said shaft coacting with the indexing device, the arm 157 on said shaft yieldably connected with the arm 158, the total key 135, the sub-total key 136, the members 133, 132 and 155 intermediate the total key and the shaft 230 for actuating the arms 157 and 158, and the lever 159 operable by the key 136 and connected with the shaft 230.

8. In a machine of the class described, the combination of a printing and listing mechanism, the latter including a special type carrier for characterization purposes, an indexing device controlling the positioning of the said special type carrier at different adjustments, the shaft 230, the arm 158 on said shaft coacting with the indexing device, the arm 157 on said shaft yieldably connected with the arm 158, the total key 135, the sub-total key 136, the members 133, 132 and 155 intermediate the total key and the shaft 230 for actuating the arms 157 and 158, and the lever 159 operable by the key 136 and connected with the shaft 230, the member 133 being provided with the cam 166′ operable by the key 136.

9. In a machine of the class described, the combination of a printing and listing mechanism, the latter including a special type carrier for characterization purposes, an indexing device controlling the positioning of the said special type carrier at different adjustments, the shaft 230, the arm 158 on said shaft coacting with the indexing device, the arm 157 on said shaft yieldably connected with the arm 158, the total key 135, the sub-total key 136, the members 133, 132 and 155 intermediate the total key and the shaft 230 for actuating the arms 157 and 158, the lever 159 operable by the key 136 and connected with the shaft 230, the member 133 being provided with the cam 166′ operable by the key 136, money paying mechanism associated with the accumulating and listing mechanisms, controlling means for said money paying mechanism, and means between said controlling means and the indexing device for positioning the latter in accordance with the particular operation of said controlling means.

10. In a machine of the class described, the combination of accumulating, paying and listing mechanisms, the latter including a special type carrier for characterizing purposes, an indexing device for said type carrier, an arm coöperative with said indexing device to position the same, a manipulative device for controlling the operativeness and inoperativeness of the paying mechanism in relation to the other mechanisms, and means intermediate said arm and said manipulative device whereby the arm is positioned to correspondingly position the indexing device for the purpose set forth.

11. In a machine of the class described, the combination of accumulating, paying and listing mechanisms, the latter including a special type carrier for characterizing purposes, an indexing device for said type carrier, an arm coöperative with said indexing device to position the same, a manipulative device for controlling the operativeness and inoperativeness of the paying mechanism in relation to the other mechanisms, means intermediate said arm and said manipulative device whereby the arm is positioned to correspondingly position the indexing device for the purpose set forth, a total key controlling totaling action of the accumulating and listing mechanisms, and means intermediate said total key and arm whereby the indexing device may be controlled as an incident to operation of the total key.

12. In a machine of the class described, the combination of accumulating, paying and listing mechanisms, the latter including a special type carrier for characterizing purposes, an indexing device for said type carrier, a shaft, operating means intermediate said shaft and the indexing device for differential positioning of the latter, a manipulative key controlling the operative relation of the paying mechanism with respect to the accumulating mechanism, means for moving said shaft from said manipulative device for positioning of the indexing device as an incident to operation of the said key, a total key for controlling the accumulating mechanism, and means intermediate said total key and the said shaft for moving the shaft as an incident to operation of the total key and thereby controlling the action of the indexing device.

13. In a machine of the class described, the combination of accumulating, paying and listing mechanisms, the latter including a special type carrier for characterizing purposes, an indexing device for said type carrier, a shaft, operating means intermediate said shaft and the indexing device for differential positioning of the latter, a yielding connection intermediate said operating means and the shaft, a manipulative key controlling the operative relation of the paying mechanism with respect to the accumulating mechanism, means for moving said shaft from said manipulative device for positioning of the indexing device as an incident to operation of the said key, a total key for controlling the accumulating mechanism, and means intermediate said total key and the said shaft for moving the shaft as an incident to operation of the total key and thereby controlling the action of the indexing device.

14. In a machine of the class described, the combination of accumulating, listing and paying mechanisms, a manipulative key controlling the operative relation of the paying mechanisms in respect to the other mechanisms, the listing mechanism including a special type carrier for characterization purposes, an indexing device for said type carrier, a shaft, an arm coacting with the indexing device for differentially positioning the same, a second arm mounted on said shaft and yieldingly connected with the first arm, means intermediate said key and the said shaft for moving the shaft and thereby positioning the indexing device at a predetermined adjustment, total taking mechanism, and means intermediate the total taking mechanism and the said shaft for moving the shaft for otherwise adjusting the indexing device.

15. In a machine of the class described, the combination of accumulating, listing and paying mechanism, a manipulative key controlling the operativeness of the paying mechanism in relation to the other mechanisms, a shaft, a plurality of total taking devices, a characterizing type carrier, an indexing device for said carrier, operating means on said shaft for setting the indexing device at different adjustments, and means intermediate the shaft and operating means aforesaid, and the total taking devices and manipulative key and said operating means whereby the indexing device may be set at different characterizing adjustments.

16. In a machine of the class described, the combination of accumulating and listing mechanism, a type carrier for characterizing purposes, manipulative total taking devices, a manipulative device for rendering the accumulating mechanism inactive for accumulation of items, an indexing device coacting with the type carrier for controlling differential movement of the latter, and means common to all of said manipulative members for predetermining the adjustment of the indexing member whereby to control the operation of the said type carrier, and including a shaft, an arm on said shaft having means engaging the indexing device, and a member yieldingly connected with said arm adapted to be directly actuated by the manipulative devices.

17. In an adding machine, the combination with an accumulating device, and wipe pawl control means therefor, of main and auxiliary total levers, the auxiliary lever being provided with a pawl controlling element, means intermediate said levers to cause simultaneous action thereof on operation of the main lever, means to effect an independent action of the auxiliary lever, and another wipe pawl controlling element operable from the said main lever.

18. In an adding machine, the combination with an accumulating device and wipe pawl control means therefor, of main and auxiliary total levers, the auxiliary lever being provided with a pawl controlling element, means intermediate said levers to cause simultaneous action on operation of the main lever, and affording independent action on operation of the auxiliary lever alone, an operating key for each lever, a sub-total control lever coöperative with the wipe pawl, means to actuate the last named lever from the main total lever, and a key for actuating the sub-total lever.

19. In an adding machine, the combination with an accumulating device and wipe pawl control means therefor, of main and auxiliary total levers, the auxiliary lever being provided with a pawl controlling element, means intermediate said levers to cause simultaneous action on operation of the main lever and affording independent action on operation of the auxiliary lever alone, an operating key for each lever, a sub-total control lever coöperative with the wipe pawl, means to actuate the last named lever from the main total lever, and means to operate the sub-total lever independently of the said main and auxiliary levers.

20. In an adding machine, the combination with an accumulating device and wipe pawl control means therefor, of main and auxiliary total levers, the auxiliary lever being provided with a pawl controlling element, means intermediate said levers to cause simultaneous action on operation of the main lever, and affording independent action on operation of the auxiliary lever alone, an operating key for each lever, a sub-total control lever coöperative with the wipe pawl, means to actuate the last named lever from the main total lever, and means to operate the subtotal lever independently of the said main lever.

In testimony whereof we affix our signatures in presence of two witnesses.

ALEXANDER E. SORUM.
ROBERT T. BROCKMAN.

Witnesses:
EDW. C. BAKER,
J. F. ROBB.